UNITED STATES PATENT OFFICE.

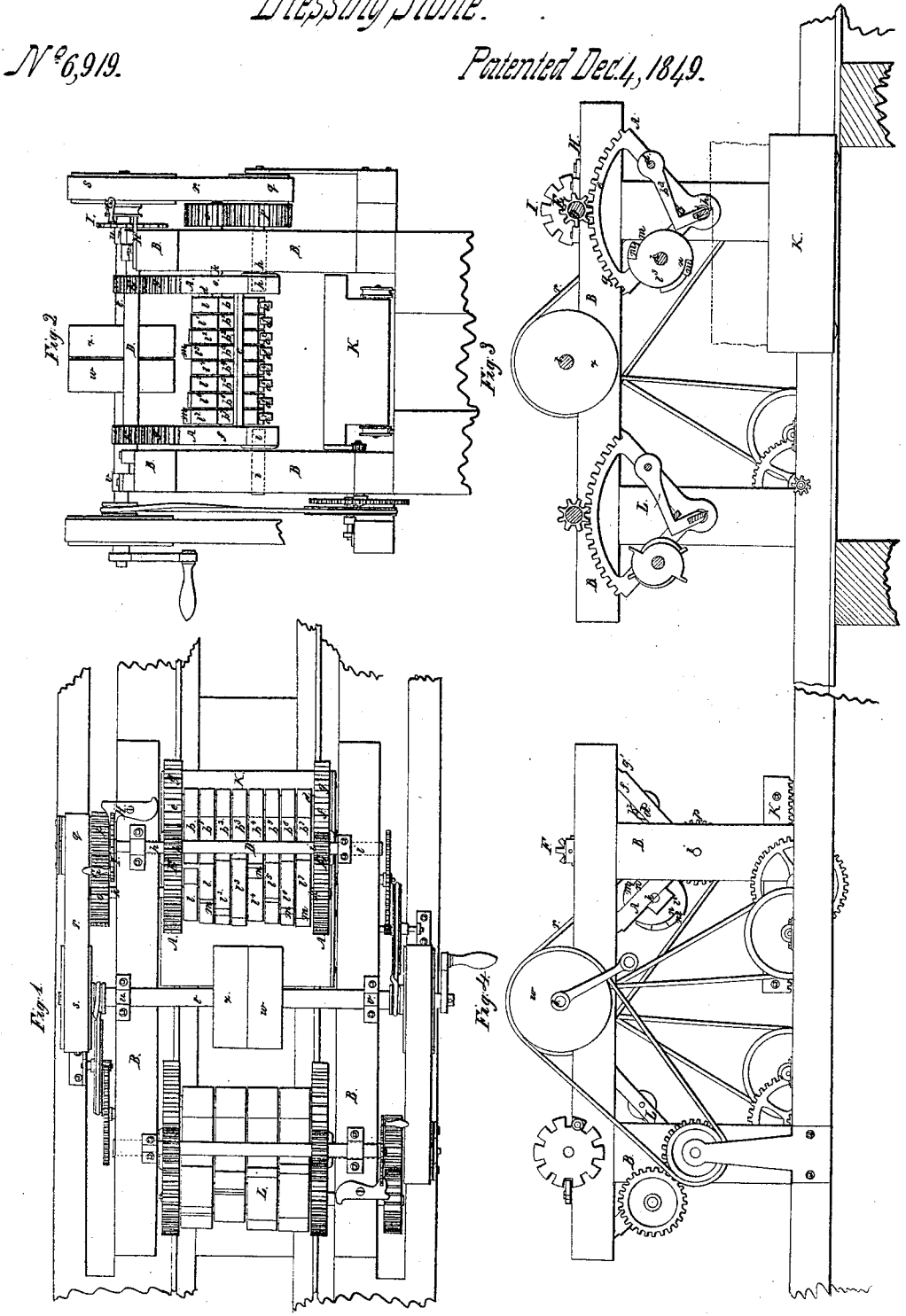

WILLIAM EAYRS, OF CONCORD, NEW HAMPSHIRE.

IMPROVEMENT IN STONE-DRESSING MACHINES.

Specification forming part of Letters Patent No. 6,919, dated December 4, 1849.

*To all whom it may concern:*

Be it known that I, WILLIAM EAYRS, of Concord, in the county of Merrimac and State of New Hampshire, have invented a new and useful or Improved Machine for Cutting or Dressing Stone; and I do hereby declare that the same is fully described and represented in the following specification and accompanying drawings, letters, figures, and references thereof.

In the said drawings, Figure 1 denotes a top view of my improved machine. Fig. 2 is a front end elevation of it. Fig. 3 is a vertical longitudinal and central section of it. Fig. 4 is a side elevation of it.

Many attempts to produce a practical operating stone cutting or dressing machine have been made, and several machines in their construction and operation have nearly approached my machine. There is, however, a difference or differences between them and mine, which though apparently small will be found to be of great importance, inasmuch as these differences, I apprehend, render my machine of as much if not a far greater value in its results when compared with them as is the Woodworth planing-machine in comparison with various other kinds of planing-machines constructed and used previous to the date of its invention.

I believe, from the amount of stone my machine is capable of dressing in any time, that there is no other machine in existence which produces the same extent of work in the same time and with so little expense. In its construction I have aimed at simplicity combined with great practical effects, and from the evidences produced by the operation of it I have good reason to think I have entirely succeeded in attaining the desired end. These remarks I make as a master workman long skilled in the art of hammering stone, one who by many years of practice has become acquainted with most if not nearly all the difficulties to be overcome. I make them with no visionary or egotistical spirit, but simply in order that my invention may be duly and properly considered both at the Patent Office and elsewhere.

The whole of my invention is to be found not only in the manner in which or by which I sustain and operate each of the chisels, but also in the means adopted to produce the percussion or blow thereon necessary to cause it to remove the surplus material from the block of stone. I would further remark that while a stone-cutter with his chisel and mallet or hammer is in the act of cutting a stone he places and holds his chisel against the part to be separated, and while so held against the same he gives the blow upon the head of the chisel. In order to produce good work he must always, at the time of giving the blow, hold the cutting-edge of the chisel firmly or close against the part to be chipped off. Otherwise the rebound of the chisel will take place, whereas it is desirable that the chisel should follow up the blow and the rebound be in the hammer alone, if anywhere.

From the above remarks and the following description it will be seen that my machine cuts the stone in very much the same manner in which a workman would with a chisel and mallet, and at the same time does the same with much greater rapidity.

In Figs. 2 and 3 of the above-mentioned drawings, $a$ $a'$ $a^2$ $a^3$, &c., are a series of chisels affixed, respectively, in and made to project from the lower ends of a series of chisel-holders $b$ $b'$ $b^2$ $b^3$, &c., each of said chisels being held in place in its holder by any suitable means. Each of said holders has a longitudinal shape, as seen in section in Fig. 3—that is to say, it is composed of two parts making an angle to each other. The upper or longest part rests at its lower end on a stationary cross-bar or rest-bar $c$, while at its upper end it turns freely in a vertical plane on a horizontal rod $d$, which, together with the rest-bar $c$, extends between and is firmly fastened to the sectional sides $e f$ of a frame A. The said two sides $e f$ have arcs of cogs $g$ $g$, and each is supported at or near its lower end by a journal made to project laterally from it, as seen by dotted lines at $h$ $i$. These journals rest and turn in suitable bearings made in or affixed to a main supporting-frame B.

The frame A supports a horizontal and transverse shaft $k$, on which the rotary hammers $l$ $l'$ $l^2$ $l^3$, &c., are affixed, and by which they are made to revolve whenever the said shaft is put in rotation on its axis. Each of the said rotary hammers consists of a heavy block or piece of metal affixed to the shaft and made with one or more striking-faces $m$ standing from it, as seen in Fig. 3. From the upper or outer edge of the said striking-face the hammer or block is gradually curved down, as seen at *n*, to the foot of the succeeding striking-face, in case there is more than one face to each block; but where each rotary block has but one striking-face the curve extends from the outer edge of the face entirely around the block and to the lower edge of the face. The object of this curve is to permit the chisel-holder to be moved away from the rest-bar after each stroke of a hammer-face, the said movement being produced in consequence of the progressive forward movement of the stone, as will be hereinafter explained.

On one end of the shaft *k* of the rotary hammer a gear-wheel *o* is fixed. This gear engages with another gear-wheel *p*, which is placed and moves loosely on the journal *h*. A drum or pulley *q* is attached to the side of the gear *p* and made to be moved or rotated by an endless belt *r*, which also passes around a drum or pulley *s*, fixed on one end of the horizontal driving-shaft *t*. The said driving-shaft *t* runs in proper boxes *u v*, and has a fast pulley *w* and a loose pulley *x* affixed to it, and for the purpose of receiving an endless belt from any suitable driving-power.

A horizontal crank-shaft D is disposed transversely over the frame A, and has two pinions E E fixed on it, the said pinions being, respectively, made to engage with the toothed gears of the frame A. By applying the hand to the crank G of the said shaft and rotating it the inclined or angular position of the chisels may be varied at pleasure. When they are arranged in any assumed angular position with respect to the upper surface of the stone, such position may be maintained by slipping a movable lever or catch H into one of the indentations of a notched wheel I, fixed on the shaft D.

The stone to be dressed or cut is placed on a platform K, which should be disposed below the chisels and have suitable machinery applied to it for the purpose of imparting to it a proper progressive forward movement under the cutters. To this portion of the machinery, (separate from the rest,) as well as any contrivance for giving motion to it, I lay no claim, as the same may be said to be in use in other stone-dressing machines.

In the drawings I have exhibited another set of hammers, chisels, and their operating machinery, the same being seen at L, and so placed with respect to that hereinbefore described as to operate on the stone after it has been subjected to the action of the first. This second set of machinery, which differs in no material respect from the first, except in the width of the cutting-chisels, is but a repetition of the first and only intended to dress or finish the surface of the stone after it has been cut by the first set of chisels. While the stone is in the act of being cut its portion to be removed should be moved regularly and progressively toward the chisels. Previous, however, to each blow of a hammer-face on a chisel the projecting part of the stone against which the edge of the chisel is to be driven has been so moved against the chisel-edge as to press it forward on its holder in a direction off or away from the rest-bar. This takes place preparatory to each blow of the hammer, which immediately following forces the chisel into the stone until the chisel-holder again meets and rests upon the rest-bar. From this it will be seen that when the blow of the hammer takes place the chisel is held closely against that part of the stone to be chipped off in essentially the same way as a workman with one hand usually holds a chisel against the stone preparatory to giving it a blow with a hammer held in his other hand. I make use of no spring or other contrivance to elevate the chisel and its stock or holder; but I cause it by the mere movement of the stone against it to be prepared for each blow of its rotary hammer.

I wish it distinctly understood that I lay no claim to the invention of one or more chisels and one or more hammers as arranged, constructed, and applied to cutting or reducing stone previous to the date of my invention or improvements; but That which I do claim is as follows, viz:

The rotary hammer as constructed and combined with each chisel-stock and made to impinge against it and permit it to immediately afterward move forward preparatory to another blow, essentially as specified.

In testimony whereof I have hereto set my signature this 8th day of August, A. D. 1849.

WILLIAM EAYRS.

Witnesses:
   STEPHEN C. BADGER,
   R. G. CUTTING.